(12) United States Patent
Fujimori

(10) Patent No.: US 9,852,304 B2
(45) Date of Patent: *Dec. 26, 2017

(54) DOCUMENT CONTROL BASED ON COPYRIGHT PERMISSION WHEN PRINTING COMPILATION OF WORKS

(71) Applicant: KONICA MINOLTA LABORATORY U.S.A., INC., San Mateo, CA (US)

(72) Inventor: Toshiro Fujimori, San Francisco, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/706,749

(22) Filed: May 7, 2015

(65) Prior Publication Data

US 2015/0242650 A1  Aug. 27, 2015

Related U.S. Application Data

(63) Continuation of application No. 13/339,742, filed on Dec. 29, 2011, now Pat. No. 9,081,979.

(51) Int. Cl.
| | |
|---|---|
| *G06F 21/00* | (2013.01) |
| *G06F 21/62* | (2013.01) |
| *H04N 1/00* | (2006.01) |
| *H04N 1/32* | (2006.01) |
| *G06F 21/10* | (2013.01) |

(52) U.S. Cl.
CPC .......... *G06F 21/6218* (2013.01); *G06F 21/10* (2013.01); *G06F 21/6209* (2013.01); *H04N 1/00143* (2013.01); *H04N 1/00838* (2013.01); *H04N 1/32128* (2013.01); *H04N 2201/3246* (2013.01)

(58) Field of Classification Search
CPC .................................. G06F 21/00; G06F 21/62
See application file for complete search history.

(56) References Cited

U.S. PATENT DOCUMENTS

| | | | | |
|---|---|---|---|---|
| 6,321,334 | B1 * | 11/2001 | Jerger ..................... | G06F 21/54 726/1 |
| 7,406,177 | B2 * | 7/2008 | Sako ................ | G11B 20/00086 369/47.12 |
| 7,650,646 | B2 * | 1/2010 | Asano ..................... | G06F 21/10 348/554 |
| 2004/0006542 | A1 * | 1/2004 | Gilliam ................... | G06F 21/10 705/51 |

(Continued)

*Primary Examiner* — William Powers
(74) *Attorney, Agent, or Firm* — Chen Yoshimura LLP

(57) ABSTRACT

A method for controlling copyright permissions when assembling multiple copyrighted works into a compiled file. The copyright permission level of each file is analyzed, either based on the copyright permission information present in metadata associated with the file or based on the digital file format of the file which reflects the permission level. The compiled file is assigned a permission level which is the same as or more restrictive than all of the permission level of the files in the compilation, and is generated in a format that enforces the assigned permission level. A notification may be displayed to the user to notify the use of the permission level assigned to the compiled file.

10 Claims, 2 Drawing Sheets

(56) References Cited

U.S. PATENT DOCUMENTS

| | | | |
|---|---|---|---|
| 2004/0096189 A1* | 5/2004 | Sako | G11B 20/00086 386/259 |
| 2005/0044391 A1* | 2/2005 | Noguchi | G06F 21/10 713/193 |
| 2006/0277219 A1 | 12/2006 | Sato | |
| 2011/0238632 A1* | 9/2011 | Vandervort | G06F 17/30011 707/690 |
| 2012/0167123 A1* | 6/2012 | Gavita | H04N 21/4223 725/10 |

\* cited by examiner

DOCUMENT CONTROL BASED ON COPYRIGHT PERMISSION WHEN PRINTING COMPILATION OF WORKS

BACKGROUND OF THE INVENTION

Field of the Invention

This invention relates to a method of controlling access and use of copyrighted documents, and in particular, it relates to such control when generating a compilation of works in electronic or printed forms.

Description of Related Art

With the wide adoption of a variety of electronic reading devices, such as e-book readers, tablet computers, smart phones, laptop computers, etc., works such as books, articles, images and graphics, etc. which are traditionally available in print forms are now increasingly being consumed in electronic (digital) forms. Consumers purchase or otherwise obtain works in electronic form suitable for electronic reading devices. Meanwhile, consumers sometimes desire to print such works in hardcopy form, for example by utilizing services commonly referred to as print on-demand (POD). POD refers to production of commercial-quality printed and finished products such as books and booklets on a relatively small scale, typically by a professional print shop, at the request of customers. In a POD transaction, a customer provides the contents (electronic form) to be printed and specifies the physical requirements of the printed product, and the print shop produces such product according to the customer's specifications.

As works are often protected by copyright, management of copyright of works being consumed in various formats (electronic, hardcopy, etc.) is important. For example, when a customer request printing of a booklet by a POD service, some contents provided by the customer may be copyrighted work, and compliance with copyright permission may be a concern.

SUMMARY

The present invention is directed to a method and related apparatus for facilitating compliance of copyright protection for works when multiple works are being assembled into a compilation in electronic and/or print form.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for generating a compiled file, which includes: receiving a plurality of digital files each representing a work, at least some of the files each having metadata associated with it which specifies a permission level for using the file or having a file format which is compatible with a permission level for using the file; receiving an user instruction to produce a compiled filed containing contents of the plurality of files; analyzing the permission level of each of the plurality of files based on the metadata associated with the file and/or the file format of the file; assigning a permission level to the compiled file, the permission level of the compiled file being the same as or more restrictive than all of the permission levels of the files; and generating the compiled file in a digital format compatible with the assigned permission level.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provides a method and related apparatus for facilitating management of and compliance with copyright protection for works such as written works, images, graphics, etc., in particular in the context of assembling multiple works into a compilation for printing or electronic distribution.

A practical scenario of such compilation may be, for example, an organization that desires to assemble and print training or educational materials for its members.

More specifically, when a user desires to assemble multiple works into a compilation and print the compilation as a booklet by a POD service, an electronic file containing the multiple works needs to be generated. Sometimes, works in the compilation may be copyrighted, and different works may have different copyright restrictions or permissions attached to them, depending on what kind of permissions have been obtained from the copyright holders. For example, the permission may be to read an article on an electronic reading device but not to print it. Or, the permission may be to read it on only one electronic reading device but the user is not permitted to make additional electronic copies. Or, the permission may be for printing a limited number of printed copies of the work, etc.

According to one embodiment of the present invention, when generating the electronic file containing the multiple works, the electronic file will be generated in a format that provides the most restrictive permission of all the different permissions attached to the different works in the compilation. For example, if some works have a "read but not print" permission, and all other have a "read and print" permission, then the resulting electronic file will be given the "read but not print" permission and will be generated in an appropriate format to reflect this permission.

According to another embodiment, when generating the electronic file for the compilation, the user is notified if undesirable or incompatible levels of permissions are detected in the compiling process. For example, in the above example where the compiled electronic file is given a "read but not print" permission, if the user's intent is to make a compiled file for purposes of printing it as a booklet, the notification will help the user identify and solve the problem, such as by obtaining a higher level of permission for some of the works.

Figure 1:
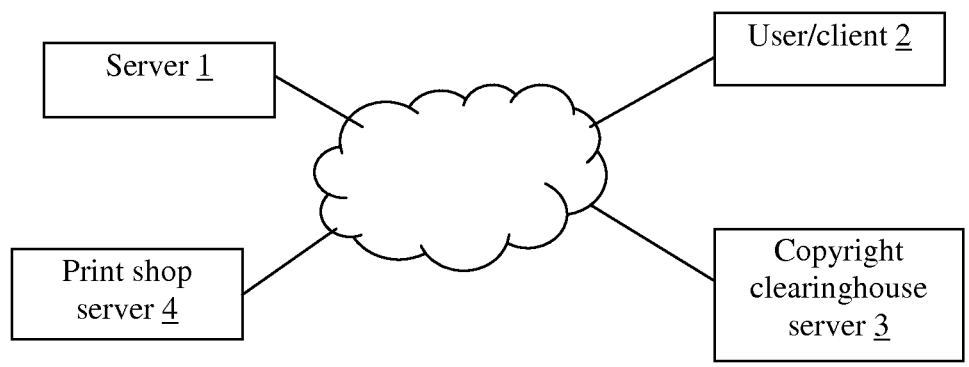
FIG. 1 schematically illustrates a system environment in which embodiments of the present invention may be implemented.

FIG. 1 schematically illustrates a system environment in which embodiments of the present invention may be implemented. The system includes a server 1, a client or user computer 2, one or more copyright clearinghouse servers 3, and a print shop server 4, connected via one or more network such as the Internet or other communication links. A user uses the client computer 2 to interact with the server 1. The server 1 executes a computer program stored in a memory to perform processes according to embodiments of the present invention. The copyright clearinghouse stores digital contents that may be obtained for use by users, and the clearinghouse server 3 manages the granting of copyright permissions for such works. The print shop may be a professional print shop equipped with printers and various other machines for producing printed products such as books, booklets, etc. The print shop server 4 manages the print jobs submitted to the print shop by customers.

Currently, copyright clearinghouses exist to facilitate distribution of copyrighted materials and to obtain and transfer payment to copyright holders. An example is Copyright Clearance Center. In addition, publishers maintain their own digital repository of published work. Various organizations may also maintain their own digital libraries. Another source of copyrighted works in digital format is retailers of electronic books (e-books). Thus, while referred to as "clearinghouse" for convenient, component 3 of the system shown in FIG. 1 may generally include any types of sources of digital content.

One functionality provided the server 1 is to allow the user to search for works in the one or more copyright clearinghouses 3. The search may be by author, title, keywords, etc. The server 1 receives a search query from the user 2, and performs multiple searches in multiple clearinghouses 3 on behalf of the user. This functionality also allows the user to acquire (e.g. through a purchase) desired works from the clearinghouses 3 with a specific permission to use the copyrighted works. The works so acquired often have metadata attached to them to specify the level of permission for use, and/or be in a format that automatically enforces certain levels of permission to use.

In addition to acquiring works from the clearinghouses 3, the server 1 also allows users to upload documents (which the user already possesses) to be included in the compilation. Some of such uploaded documents may, similar to works acquired from the clearinghouses 3, have copyright metadata data attached to them and/or be in a format that automatically enforces certain levels of permission to use.

Another functionality provided by the server 1 is to assist the user to compile the multiple works into an electronic file. Various editing functions may be provided.

Another functionality provided by the server 1 is to interact with the print shop server 4 to submit a compiled file for printing.

Thus, the server 1 provides an integrated service that allows a user to search and acquire copyrighted works from sources of such works, upload his own files, compile them into an electronic file, and submit the compiled file to a POD service to produce a printed product. The users may establish accounts on the server 1 and store digital contents in his account, making it easy to manage digital contents for printing and other purposes.

The physical locations or the commercial relationship among the various components of the system of FIG. 1 are not important. For example, the server 1 may be operated by the copyright clearinghouse 3, or the print shop, or a separate organization or commercial establishment.

Figure 2:
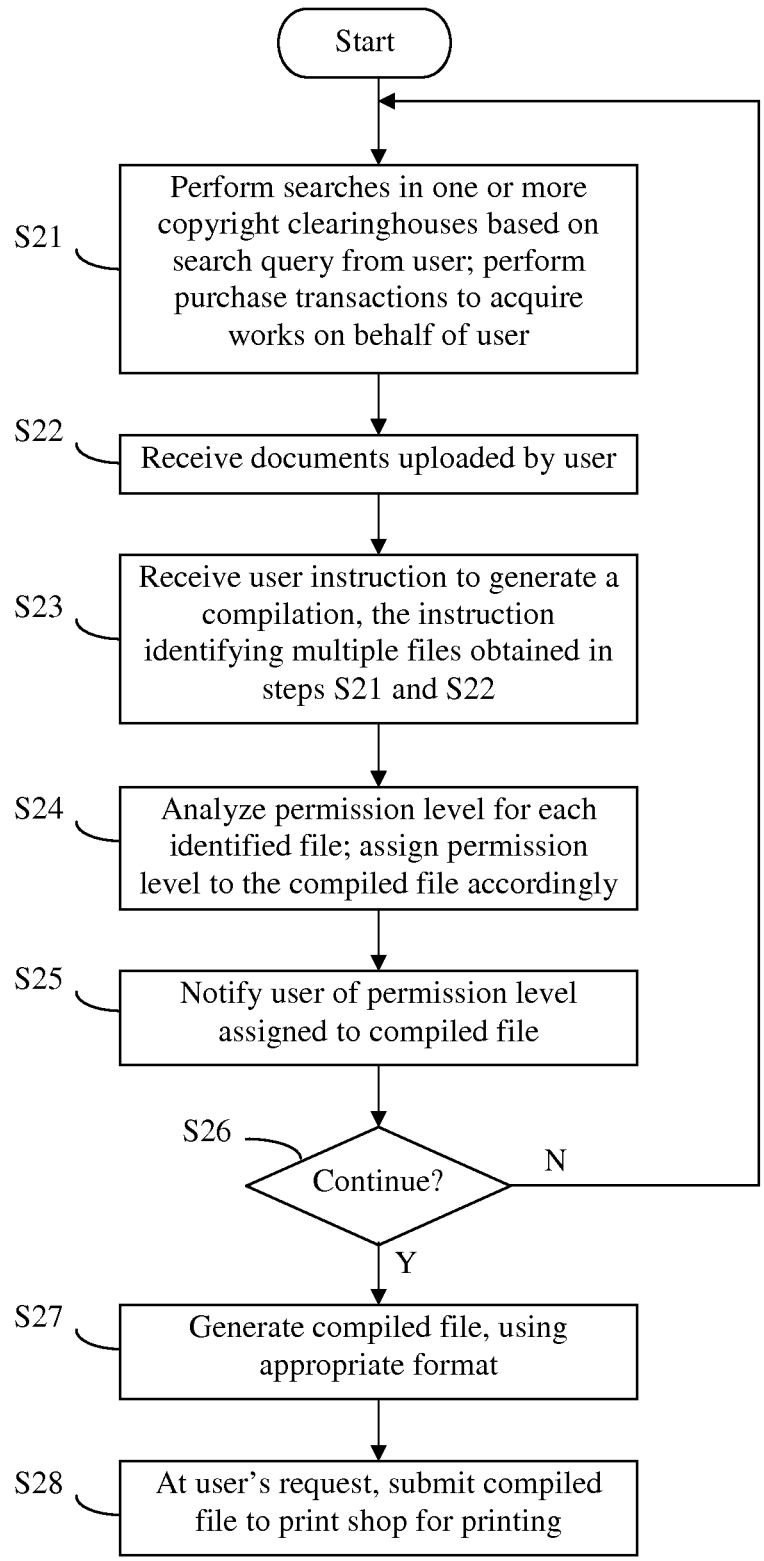
FIG. 2 illustrates a computer-implemented method for generating a compilation of works according to an embodiment of the present invention.

A method implemented in the server 1 is described with reference to FIG. 2. A GUI is preferably provided to allow the user 2 to interact with the server program to perform various steps of the process.

In step S21, the server 1 receives a search query from the user 2 and performs a search in one or more clearinghouses 3. If the user desires to acquire any works from any of the clearinghouses 3, the server 1 performs purchase transactions on behalf of the user to obtain the work (step S21). It should be noted that the term "purchase" is used in this disclosure to refer to transitions regardless of whether they involve a payment of money. As a result of the purchase transactions, works are downloaded to the server 1 from the clearinghouse 3 as electronic files (step S21).

Typically, the files downloaded from the clearinghouses 3 have metadata associated with them which describes, among other things, the type of copyright permission granted for this copy of the work. In addition, the files may be in various electronic formats that restricts their use. For example, certain forms of PDF files allow the file to be viewed on an electronic device but not printed, or allow the file to be printed but not viewed on the electronic device. As another example, files in some format may only be read by certain devices or certain software programs; examples include various e-book formats. In another example, some files may be encrypted and can only be viewed or otherwise used by a user holding necessary decryption keys.

In step S22, the user uploads his own files onto the server 1. Some of these files may have metadata associated with them, and/or be in an electronic format that restricts their use, similar to those described in the preceding paragraph. For example, some of the user-uploaded files may have been previously obtained from a copyright clearinghouse 3. Steps S21 and S22 may collectively be considered a step of obtaining electronic files that can be later assembled into a compilation.

In step S23, the server 1 receives an instruction from the user to compile multiple files into a compilation. The instruction identifies the files to be included in the compilation, their order, editing format, and other additional information. As mentioned earlier, a GUI may be used to provide an interactive way for the user to specify the various requirements of the compilation.

In response to the instruction, the server 1 analyzes the permission level for each identified file of the compilation, and based on this analysis, assigns a permission level to the file being compiled (step S24). The analysis for each file may be done by inspecting the metadata associated with the files, and/or detecting the permission level based on the format of the files. For example, the permission level for a file will be "read but not print" if the metadata so specifies or if the file is in a format that allows viewing but not printing. If no relevant metadata is associated with a file and it is in a format that permits unrestricted use, the use for that file is not restricted.

The permission level assigned to the compiled file is one that is the same as or more restrictive than all of the permission level of the files in the compilation. A suitable logic operation may be implemented to ensure that permission level of the compiled file meets the above requirement. For example, if some of the files have a permission level of "read but not print" and all other files have a permission level of "read and print", then the compiled file will be given a permission level of "read but not print". If some files have a permission level of "read but not print" and some other files have a permission level of "print but not read", the permission level of the compiled file will be "neither read nor print".

As seen from the above examples, as a result of the permission level analysis, the compiled file may be given a permission level that makes it impractical or useless for the user. In step S25, the user is notified of the permission level being assigned to the compiled file, and given the options to continue with or discontinue the compilation request. If the user chooses to discontinue the compilation ("N" in step S26), the user may go back to previous steps of the process to obtain other works from the clearinghouses 3 or obtain different levels of permission for some of the works (step S21), upload other files to the server 1 (step S23), and re-attempt to make a compilation (step S23).

If the user chooses to continue with the compilation process ("Y" in step S26), the server 1 generates a compiled file which contains the content of the multiple files identified in the user instruction and complies with the editing format requirements of the user instruction (step S27). The format of the file is one that is consistent with the permission level assigned in step S24. As described earlier, various electronic file formats are available that enforces various types or levels of permission for use. More such formats may become available in the future. Any suitable method may be used to generate the compiled file in an appropriate file format compatible with the permission level.

After the compiled file is generated, the server 1 may submit the compiled file to the print shop server 4 for printing at the user's request (step S28). The user may also choose to distribute the electronic file without printing.

In an alternative embodiment, if the permission level assigned to the compiled file in step S24 is sufficiently permissive, for example it allows both read and print, the notification steps S25 and S26 may be omitted. In one example, the user instruction received in step S23 contains a request to print the compiled file. In such a case, the notification is generated in step S25 if the permission level assigned to the compiled file does not allow printing; otherwise the notification is omitted.

It will be apparent to those skilled in the art that various modification and variations can be made in the method and related apparatus of the present invention without departing from the spirit or scope of the invention. Thus, it is intended that the present invention cover modifications and variations that come within the scope of the appended claims and their equivalents.

What is claimed is:

1. A method for generating a compiled file, comprising:
   receiving a plurality of digital files each representing a work, at least some of the files each having metadata associated with it which specifies a permission level for using the file or having a file format which is compatible with a permission level for using the file, wherein each permission level includes a print-permission parameter regarding whether or not to permit printing of the file;
   receiving a user instruction to produce a compiled file containing contents of the plurality of files;
   analyzing the permission level of each of the plurality of files based on the metadata associated with the file and/or the file format of the file, and comparing a plurality of permission levels of the plurality of files to determine a most restrictive permission level among the plurality of permission levels of the plurality of files contained in the compiled file, wherein the determined most restrictive permission level includes a print-permission parameter regarding whether or not to permit printing of the compiled file which is the most restrictive among the print-permission parameters of the plurality of permission levels of the plurality of files;
   when the print-permission parameter of the determined most restrictive permission level indicates that printing of the compiled file is not permitted;
      notifying the user of the most restrictive permission level which is to be assigned to the compiled file;
      after the notification, receiving a response from the user containing an instruction to continue with compilation; and
      after receiving the response from the user, generating the compiled file containing the contents of the plurality of files indicated in the user instruction, the compiled file having an assigned permission level which is the same as or more restrictive than the most restrictive permission level of the plurality of files determined by the comparison; and
   when the print-permission parameter of the determined most restrictive permission level indicate that printing of the compiled file are permitted, generating the compiled file containing the contents of the plurality of files indicated in the user instruction, the compiled file having an assigned permission level which is the same as or more restrictive than the most restrictive permission level of the plurality of files determined by the comparison, without notifying the user.

2. The method of claim 1, wherein the step of generating the compiled file with the assigned permission level includes:
   generating the compiled file in a digital format in accordance with the assigned permission level.

3. The method of claim 2, wherein the digital format of the compiled file is chosen from a plurality of digital formats and is compatible with the permission level assigned to the compiled file.

4. The method of claim 1, wherein the step of generating the compiled file with the assigned permission level includes:
   generating the compiled file; and
   associating metadata with the compiled file which describes the permission level assigned to the compiled file.

5. The method of claim 4, further comprising:
   if the permission level of the compiled file allows for printing, submitting the compiled file for printing.

6. A computer program product comprising a computer usable non-transitory medium having a computer readable program code embedded therein for controlling a data processing apparatus, the computer readable program code configured to cause the data processing apparatus to execute a process for generating a compiled file, the process comprising:
   receiving a plurality of digital files each representing a work, at least some of the files each having metadata associated with it which specifies a permission level for using the file or having a file format which is compatible with a permission level for using the file, wherein each permission level includes a print-permission parameter regarding whether or not to permit printing of the file;
   receiving a user instruction to produce a compiled file containing contents of the plurality of files;
   analyzing the permission level of each of the plurality of files based on the metadata associated with the file and/or the file format of the file, and comparing a plurality of permission levels of the plurality of files to determine a most restrictive permission level among the plurality of permission levels of the plurality of files contained in the compiled file, wherein the determined most restrictive permission level includes a print-permission parameter regarding whether or not to permit printing of the compiled file which is the most restrictive among the print-permission parameters of the plurality of permission levels of the plurality of files;

when the print-permission parameter of the determined most restrictive permission level indicates that printing of the compiled file is not permitted;
  notifying the user of the most restrictive permission level which is to be assigned to the compiled file;
  after the notification, receiving a response from the user containing an instruction to continue with compilation; and
  after receiving the response from the user, generating the compiled file containing the contents of the plurality of files indicated in the user instruction, the compiled file having an assigned permission level which is the same as or more restrictive than the most restrictive permission level of the plurality of files determined by the comparison; and when the print-permission parameter of the determined most restrictive permission level indicate that printing of the compiled file are permitted, generating the compiled file containing the contents of the plurality of files indicated in the user instruction, the compiled file having an assigned permission level which is the same as or more restrictive than the most restrictive permission level of the plurality of files determined by the comparison, without notifying the user.

7. The computer program product of claim 6, wherein the step of generating the compiled file with the assigned permission level comprises:
  generating the compiled file in a digital format in accordance with the assigned permission level.

8. The computer program product of claim 7, wherein the digital format of the compiled file is chosen from a plurality of digital formats and is compatible with the permission level assigned to the compiled file.

9. The computer program product of claim 6, wherein the step of generating the compiled file with the assigned permission level comprises:
  generating the compiled file; and
  associating metadata with the compiled file which describes the permission level assigned to the compiled file.

10. The computer program product of claim 9, wherein the process further comprises:
  if the permission level of the compiled file allows for printing, submitting the compiled file for printing.

* * * * *